Dec. 5, 1967  W. W. WHITEHEAD  3,356,420
VEHICLE WHEEL STRUCTURE WITH DEMOUNTABLE RIM
ATTACHING PIVOTED SEGMENTS
Filed Aug. 17, 1966  2 Sheets-Sheet 1
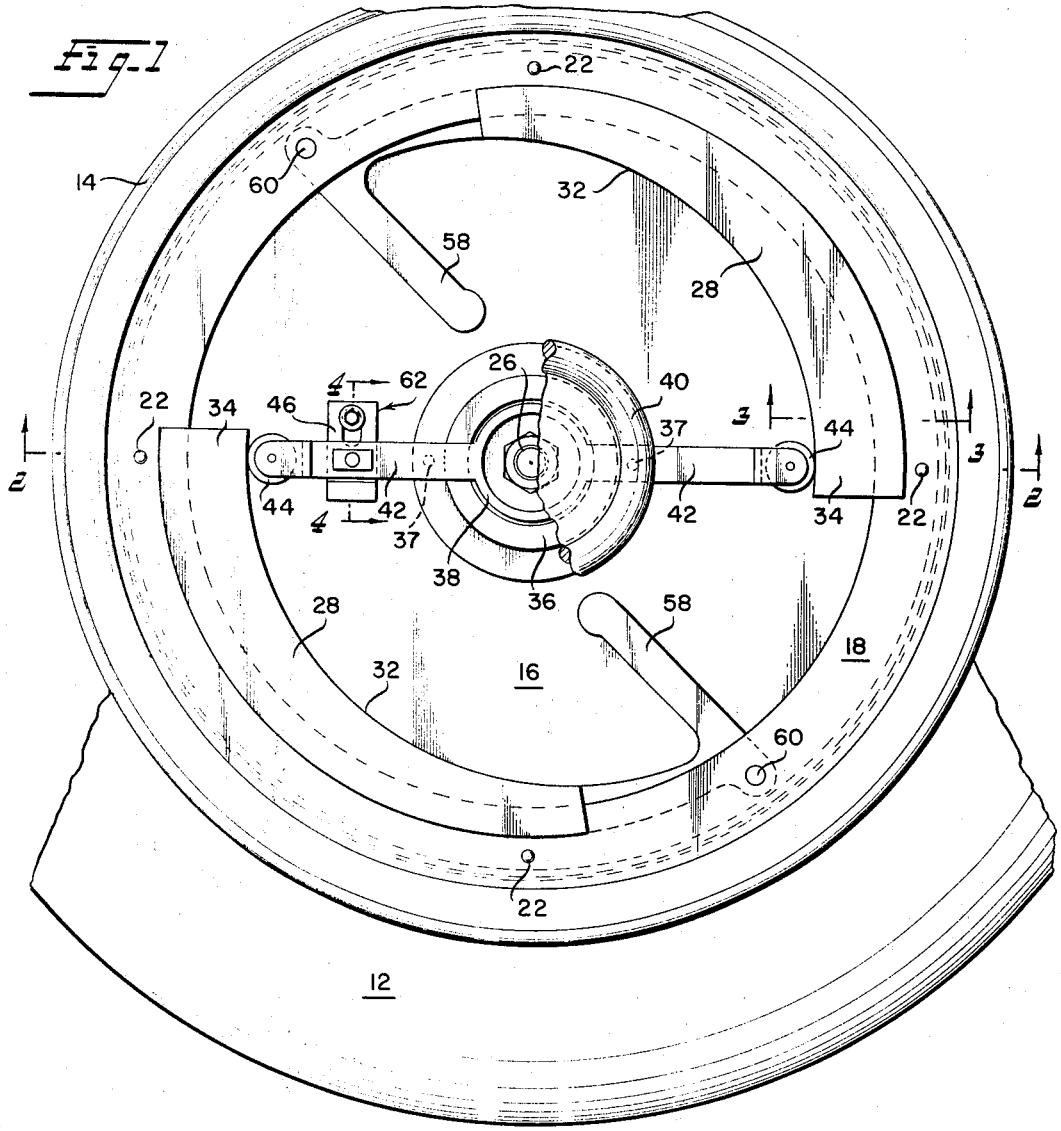
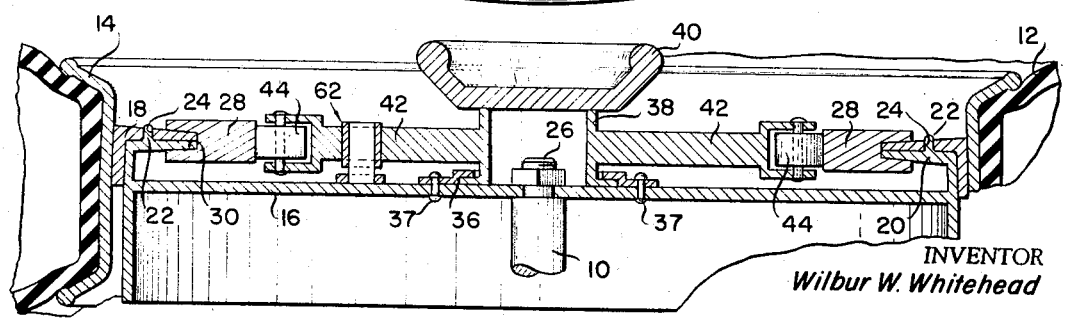
INVENTOR
Wilbur W. Whitehead
BY
Misegades & Douglas
ATTORNEYS Dec. 5, 1967 W. W. WHITEHEAD 3,356,420
VEHICLE WHEEL STRUCTURE WITH DEMOUNTABLE RIM
ATTACHING PIVOTED SEGMENTS
Filed Aug. 17, 1966 2 Sheets-Sheet 2

INVENTOR
Wilbur W. Whitehead
BY Misegades & Douglas
ATTORNEYS

United States Patent Office 3,356,420
Patented Dec. 5, 1967

3,356,420
VEHICLE WHEEL STRUCTURE WITH DEMOUNT-ABLE RIM ATTACHING PIVOTED SEGMENTS
Wilbur W. Whitehead, Wendell, Idaho 83355
Filed Aug. 17, 1966, Ser. No. 573,112
9 Claims. (Cl. 301—11)

This invention relates generally to a vehicle wheel structure, and more particularly to means for securing a vehicle wheel to a brake drum cover assembly, the means adapted to permit quick and easy attachment and detachment of the wheel from the brake drum cover.

Since the invention of the motor vehicle around the turn of the century, innumerable developments have taken place so that today the modern automobile or truck bears little resemblance to its ancestor; one basic component is an exception. This basic component is the means for attaching a vehicle wheel to the brake drum cover. Modern automobile and truck wheels are still attached to the vehicle in the same manner as they were 30 or more years ago in that the usual brake assembly cover is provided with five radially spaced threaded studs which receive the vehicle wheel; in turn, the wheel is then firmly secured by five threaded nuts. There are two distinct disadvantages to this conventional assembly. The first is that entirely too much time must be taken to remove a wheel and replace it. The second disadvantage concerns the ever-present problem of changing a flat tire with the aid of only the normally inadequate jack mechanism provided with most automobiles. Such jacks are normally unwieldy; tightening and loosening the usual nuts on the wheel may cause the jack to collapse.

The present invention overcomes these disadvantages by providing a vehicle wheel mounting means that permits ready attachment and removal of a vehicle wheel without benefit of any tools whatsoever. Additionally, all of the movable parts of the invention are mounted on a modified brake drum cover. Finally, the invention is designed of optimum simplicity, to be easy to use and low in cost of manufacture.

Basically, the invention comprises a pair of holding shoes pivotally mounted to a brake drum cover along a diameter thereof, one on each side of the center of the brake cover, an internally directed outstanding flange about the rim of the brake drum, a mating lip for the flange mounted on a vehicle wheel rim, and a rotatable assembly mounted at the center of the brake drum, including a pair of pressure arms for camming the shoes against the lip and flange to secure them firmly together. Additionally, a key operated lock is provided on one of the pressure arms to prevent loosening of the camming shoes. Finally, a pair of inwardly directed release arms are mounted on each camming shoe to permit the pressure arms to strike the release arms to detach the shoes from their cammed position, thus permitting ready removal of the vehicle wheel from the brake drum cover.

Further details of construction as well as objects and advantages of the invention may be had by reference to the following specification and drawings in which:

FIGURE 1 is a partial elevational view, partly in section, of the invention showing the basic components thereof;

FIGURE 2 is a sectional view taken along lines 2—2 of FIGURE 1;

Figure 3:
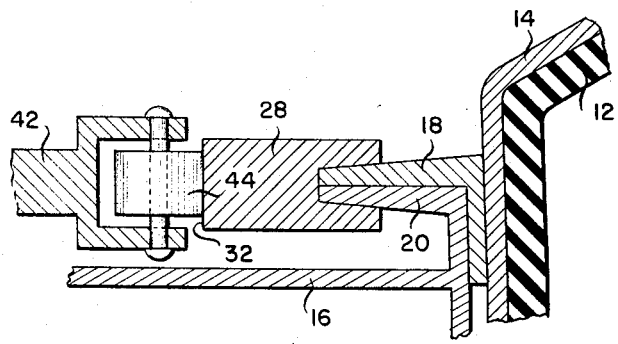
FIGURE 3 is another sectional view taken along lines 3—3 of FIGURE 1.

Referring now to the drawings by reference character, and in particular to FIGURES 1 and 2, there is shown the invention and standard wheel components including axle 10 and tire 12. The usual wheel rim 14 is provided for tire 12, and the standard brake assembly (not shown) is enclosed by a brake drum cover 16. Wheel rim 14 is provided with an interior, annular lip 18 which is adapted to mate with an annular flange 20 mounted about the circumferential edge of brake drum cover 16. As can be seen in FIGURES 2 and 3, the upper surface of flange 20 and lower surface of lip 18 are bevelled slightly in the direction of the center of the wheel assembly so as to form a wedge in cross section. FIGURES 1 and 2 indicate a plurality of pins 22, mounted radially about flange 20 and a plurality of mating bores 24 for pins 22 in lip 18. The radially spaced pins and bores are provided to prevent translational movement between flange 20 and lip 18 when the lip and flange are in a nesting, or mating relationship.

The remainder of the invention includes the movable parts which are used to firmly lock lip 18 and flange 20 firmly together in mating relationship so that wheel rim 14 and tire 12 are firmly secured to brake drum cover 16. In turn, cover 16 is firmly attached to axle 10 in the usual manner, as by bolt 26.

A pair of holding shoes 28, 28 are pivotally mounted along a diameter of cover 16, one on each side of the center of the cover, as shown in FIGURE 1. Each shoe 28 includes an outward-facing annular slot 30 which is slightly tapered in order to accommodate the wedge shape of lip 18 and flange 20 when mated, as shown best by FIGURE 3. The length of both slots 30, 30 is greater than one-half the circumference of lip 18 and flange 20 so as to assure the integrity of the assembly when the lip and flange are in a mating, locked position. Shoe 28 is provided with an interior surface 32 which is cammed toward free end 34 of shoe 28.

An operative assembly is provided and mounted centrally on cover 16 to firmly cam shoes 28 outwardly so as to lock lip 18 and flange 20 together. The assembly includes a flange ring 36, welded or secured to cover 16 as by rivets 37 about axle 10. A cylindrical support collar 38 is rotatably mounted within collar 36 and includes a graspable handle 40 thereon, for turning collar 38. Support collar 38 carries a pair of opposed, radially operative arms 42, 42 which are used to cam shoes 28 into a locking position. Anti-friction means such as rollers 44, 44 are mounted on the outer ends of arms 42, 42; this reduces the amount of torque required to turn handle 40 and cam shoes 28 into a locking position.

Figure 4:
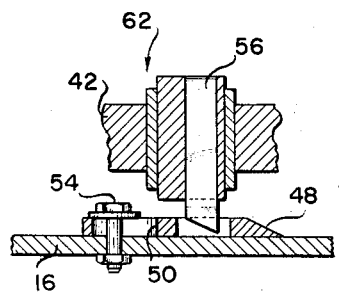
FIGURE 4 is yet another sectional view taken along lines 4—4 of FIGURE 1.
Figure 5:
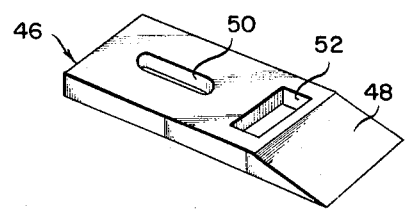
FIGURE 5 is a view in perspective of a latch plate for the locking assembly.
Figure 6:
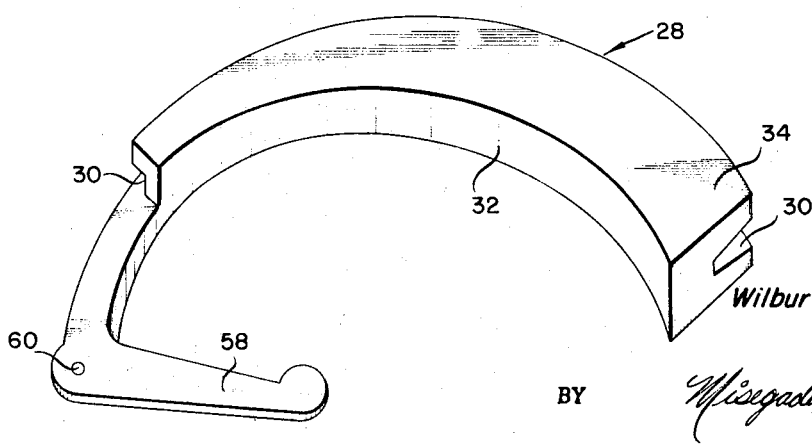
FIGURE 6 is a perspective view of one of the holding shoes of the invention.

Arms 42, 42 may be firmly secured in the locking position illustrated by FIGURE 1 by means of a latch plate and a bolt assembly indicated in detail in FIGURES 4 and 5. Latch plate 46 (FIGURE 5) includes a bevelled, strike edge 48, a longitudinal slot 50 and recess 52. Plate 46 is secured to cover 16 by means of a bolt 54; slot 50 is provided to allow circumferential adjustment of plate 46 with respect to the center of cover 16. This adjustment is provided as wear and tear on the invention after prolonged use may require some adjustment of the locking mechanism. The remainder of the locking mechanism includes a simple key operated bolt 56, mounted on one arm 42. It might be noted that provision of this lock not only assures rigid securance of the wheel to brake drum cover 16, but also discourages tire theft.

Each shoe 28 is provided with a radially directed release arm 58 adjacent pivot mount 60 of shoe 28. The release arms 58, 58 are useful in removing the wheel in that they may be struck by a counter-clockwise rotation of arms 42 initiated by rotation of handle 40 so as to break the wedge grip of each shoe 28 on lip 18 and flange 20.

The operation of the invention may be simply described. To attach a wheel to the cover 16, one merely places the wheel on the cover so that pins 22 are aligned with bores 24. Shoes 28, 28 may then be rotated outwardly so that slot 30 fits over rim 30 and flange 20. The shoes are then cammed into a locking position by rotation of handle 40 to the position indicated by FIGURE 1. Finally, bolt 56 may be depressed into recess 52 to lock arms 42, 42 firmly in place. In the same manner, removal of the wheel from the brake drum cover 16 is a simple operation. First, the bolt 56 is removed from its position in recess 52 by means of the key operated block 62 (FIGURE 1). Handle 40 is then rotated in a counter-clockwise direction until it strikes release arms 58, 58. This striking action will cause shoes 28, 28 to be released from lip 18 and flange 20. Finally, shoes 28, 28 are rotated inwardly toward axle 10, so that the vehicle wheel may be removed.

It can be seen from the foregoing that I have invented a new and highly useful device in the art of vehicle wheel mounting assemblies, and therefore, I am not to be limited to the construction as hereinbefore provided, except as may be deemed to be within the scope of the following claims.

I claim:

1. In a vehicle wheel and axle assembly wherein a brake cover is mounted on the axle and the wheel is provided with an internal rim: a radially inwardly directed, annular lip on the wheel rim; a mating annular flange on the brake cover; a pair of holding shoes pivotally mounted on said cover, said pivot axis being substantially parallel to the wheel axis of rotation, each said shoe including means defining a slot therein, said slot being formed to fit a substantial circumferential portion of said flange and lip, each said shoe also including an internal arcuate face defining a spiral segment, and means mounted on said brake cover cooperating with said spiral segments for camming said shoes outwardly into a locking position about said lip and flange.

2. The structure of claim 1 wherein one of said lip and said flange is provided with a plurality of radially spaced pins and the other of said lip and said flange is provided with a plurality of radially spaced mating bores for said pins, whereby translational movement between said lip and flange is prevented when said lip and flange are in nested, mating relationship.

3. The structure of claim 1 wherein said holding shoes are pivotally mounted on approximately a diameter of said brake cover, one on each side of the center of said cover.

4. The structure of claim 1 wherein both said external slots together have a length greater than one-half the circumference of said lip and flange, said lip and flange being tapered to form an inwardly directed wedge in cross section, each said slot being tapered to mate with said lip and flange.

5. The structure of claim 1 wherein said means for camming the shoes comprises a flange ring, mounted centrally of said brake cover, a cylindrical collar support, rotatably secured in said flange ring, handle means for rotating said support, and a pair of opposed, radial arms, one to each cammed face.

6. The structure of claim 5 wherein each said arm is provided with anti-friction means comprising a freely rotating roller at the end of said arm, said roller adapted to contact said arcuate face.

7. The structure of claim 1 wherein each said shoe is provided with a radially inwardly directed release arm, mounted adjacent the pivotal mount of said shoe on said cover, each arm being adapted to be struck by one of said radial arms, whereby said shoe may be released from a locked position about said lip and flange.

8. The structure of claim 7 wherein one of said arms is provided with means for locking said arm to said cover, comprising a latch plate mounted on said cover, a latch recess in said latch plate, and a key operated bolt, mounted on said arm, and adapted to be depressed into said recess.

9. The structure of claim 8 wherein said latch plate includes an elongated slot and a bolt through said slot to said cover, whereby circumferential adjustment of said latch plate about the center of said brake cover is provided.

References Cited

UNITED STATES PATENTS

| | | | |
|---|---|---|---|
| 2,490,486 | 12/1949 | Spurlock | 301—9 |
| 2,592,707 | 4/1952 | Kelderman | 301—9 |
| 2,949,332 | 8/1960 | Madsen | 301—11 |

FOREIGN PATENTS

| | | |
|---|---|---|
| 650,941 | 10/1928 | France. |

RICHARD J. JOHNSON, *Primary Examiner.*